May 9, 1939.    R. W. LUCE    2,157,209
METHOD OF MAKING LENSES
Filed March 22, 1938

INVENTOR
Richard W. Luce
BY
Victor D. Borst
ATTORNEY

Patented May 9, 1939

2,157,209

UNITED STATES PATENT OFFICE 2,157,209

METHOD OF MAKING LENSES

Richard W. Luce, Westfield, N. J., assignor to Signal Service Corporation, a corporation of Delaware Application March 22, 1938, Serial No. 197,326

3 Claims. (Cl. 51—278)

The invention herein disclosed relates to a method of making lenses and it is particularly suitable for the manufacture of lenses having a lenticular surface at one end and a plano surface at the other end.

Such lenses are commonly used in autocollimating units of the type used in making up roadside warning signs. Heretofore, the lenses have been made by molding lenses individually from cane glass. The lenticular surface of the lens is formed in the molding operation and the plano surface is subsequently formed by grinding and polishing the opposite end of the lens unit. If it be desired to grind and polish several of such lenses simultaneously, it is necessary to set the lenses individually on the grinding block. This requires great care and much time in order to have the several lenses properly aligned so that the surfaces of the several lenses are properly ground.

It is an object of this invention to facilitate the setting of several lenses to be ground simultaneously and to reduce the cost of producing such lenses.

In accordance with the invention, several lenses are molded in a gang and are held together by the glass uniting the ends thereof on which the plano surface is to be formed. The several lenses are thus maintained in proper relation to each other and so united, they are set in pitch on a grinding block. When the pitch sets, the excess glass uniting the ends of the several lenses is ground away to separate the lenses and the ends of the separated lenses are ground and polished simultaneously.

The manner in which the lenses are molded and set in the grinding block is illustrated in the accompanying drawing in which.

Figure 1:
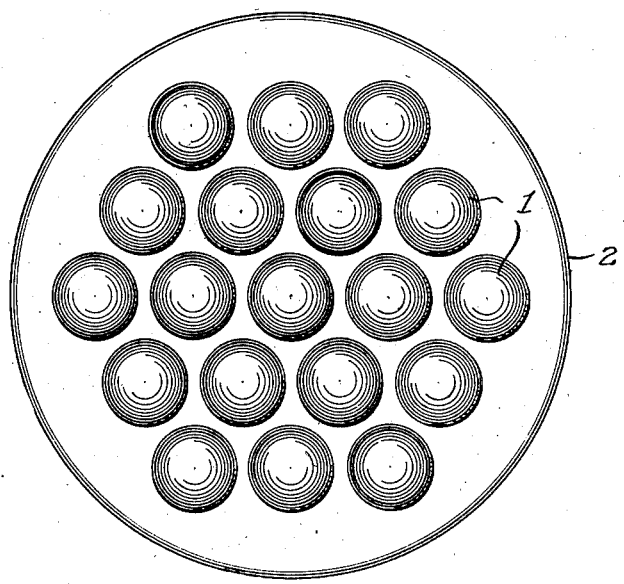
Fig. 1 is a plan view of a gang of molded lenses;
40.
Figure 2:
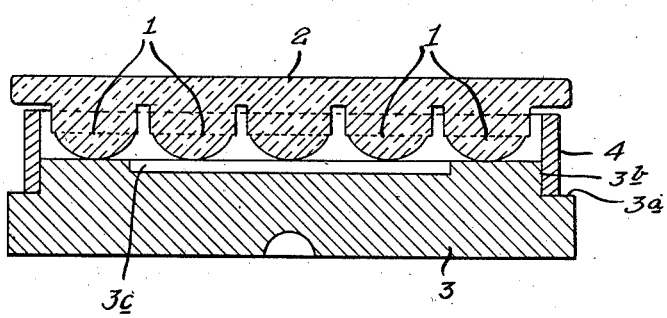
Fig. 2 is a longitudinal section of a grinding block with a gang of lenses set therein.

In accordance with the invention, lenses suitable for autocollimating units and which include a lenticular end, a short cylindrical body portion and a plane end surface opposite the lenticular end, are molded in a gang as illustrated in Fig. 1. In Fig. 1, there is shown a gang of lenses consisting of nineteen lenses 1 molded on a glass base 2. The lenticular ends of the lenses are formed in the molding operation and the excess material forms the base of this gang of lenses, connecting the ends of the lenses on which the plane surfaces are to be formed.
The gang of lenses so formed is mounted in a grinding block 3 as illustrated in Fig. 2. The grinding block is made of metal and is circular in plan. An external, annular shoulder 3a is formed on the block by reducing the diameter thereof and the reduced portion 3b is recessed at 3c, leaving an annular end surface. A metal ring 4 embraces the portion 3b with the end thereof resting upon the ledge 3c. The gang of lenses is inserted within the ring 4 and the outer circumferential series of lenses abut against the annular surface of the block. By recessing the block, any inaccuracies in the lengths of the lenses are compensated because only the outer circle of lenses engage the surface of the mounting block. Before the lenses are thus inserted within the ring 4, the space within the ring 4 is filled with molten pitch. The ring 4 is of such width that it does not contact with the base uniting the several lenses so that when the lenses are forced into the pitch, any excess pitch may flow out over the edge of the ring. When the pitch hardens, the lenses are ready for grinding.

In the grinding operation, the grinding block is placed in the grinding machine in a manner well known in the art and the base uniting the several lenses is ground away so that the lenses are separated into individual units. Thereafter the ends of these individual units are ground and polished simultaneously.

Since the lenses are all properly mounted upon the base when they are inserted into the mold, they are properly aligned in the mold and there is no possibility of their being out of line when their surfaces are ground and polished. This avoids the necessity of individually fitting to the grinding block and aligning several lenses individually, and it greatly facilitates the grinding and polishing operation of the lenses.

It will be obvious that various changes may be made by those skilled in the art in the details of the steps of the method for making lenses described above within the principle and scope of the invention as expressed in the appended claims.

I claim:

1. The method of grinding and polishing lenses of the type described which method comprises molding several lenses in a gang and united together, setting the several united lenses in pitch on a grinding block, grinding away the material uniting the several lenses and grinding and polishing the several lenses simultaneously.

2. The method of making lenses of the type described which method comprises molding several lenses in a gang with the corresponding ends of the several lenses united, setting the lenses in pitch on a grinding block and grinding away the material uniting the lenses to separate the lenses.

3. The method of making lenses of the type described which method comprises folding several units in a gang with the corresponding ends of the several lenses united, setting the several united lenses in pitch on a grinding block, grinding away the material uniting the lenses and grinding and polishing the several lenses simultaneously.

RICHARD W. LUCE.